Figure 1:
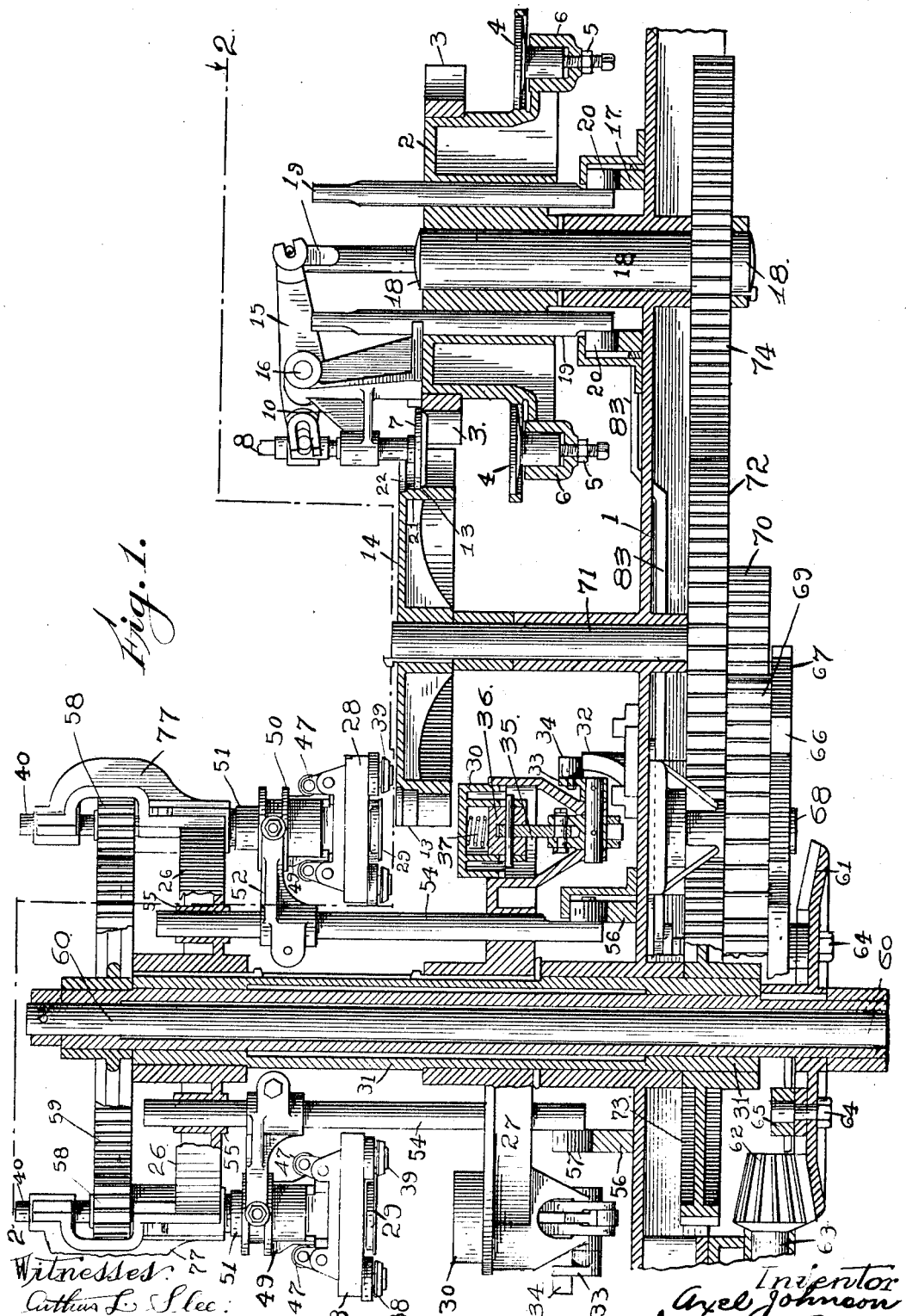

A. JOHNSON.
COMBINED CAN BODY FLANGING AND DOUBLE SEAMING MACHINE.
APPLICATION FILED DEC. 5, 1910.

1,040,951.

Patented Oct. 8, 1912.

9 SHEETS—SHEET 1.

A. JOHNSON.
COMBINED CAN BODY FLANGING AND DOUBLE SEAMING MACHINE.
APPLICATION FILED DEC. 5, 1910.

1,040,951.

Patented Oct. 8, 1912.

9 SHEETS—SHEET 3.

A. JOHNSON.
COMBINED CAN BODY FLANGING AND DOUBLE SEAMING MACHINE.
APPLICATION FILED DEC. 5, 1910.

1,040,951.

Patented Oct. 8, 1912.

9 SHEETS—SHEET 4.

Witnesses:
Arthur L. Slee.
S. Constine.

Inventor:
A. Johnson
by M. A. Acker
his atty.

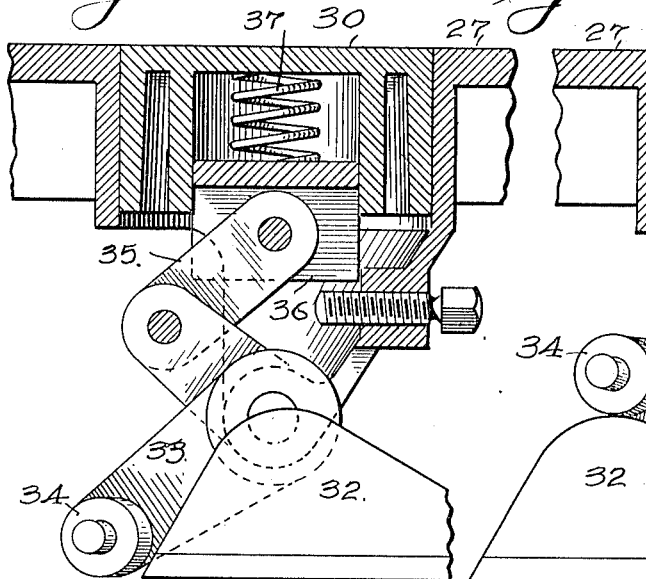
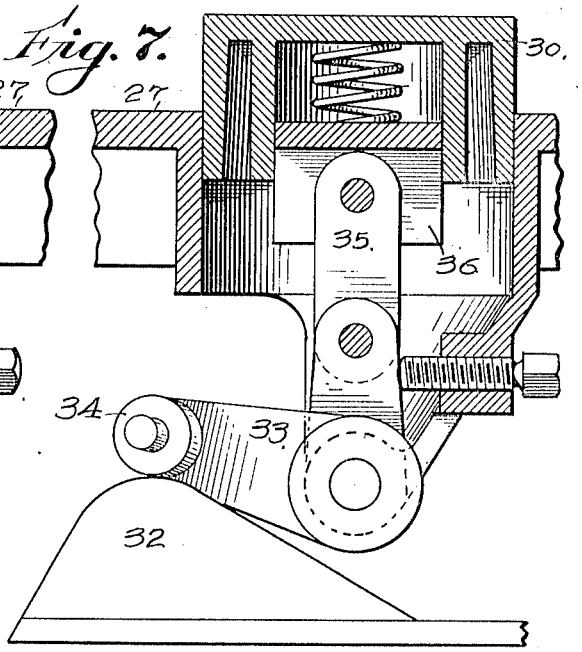
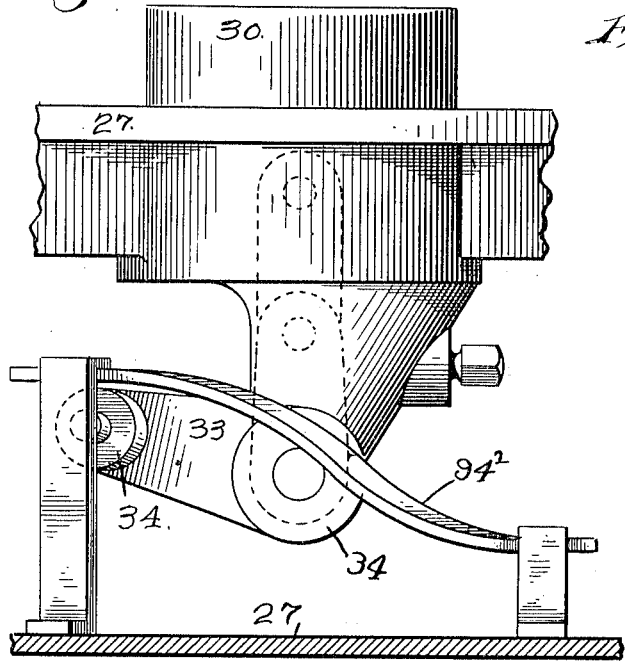
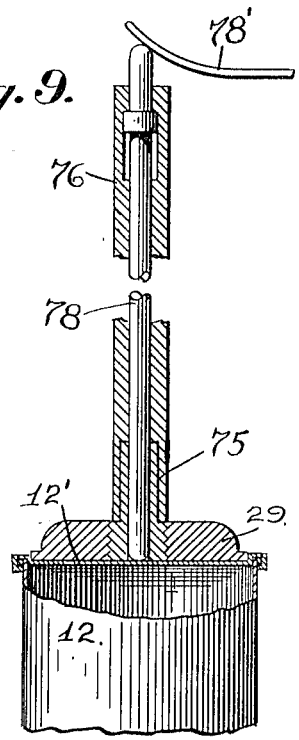

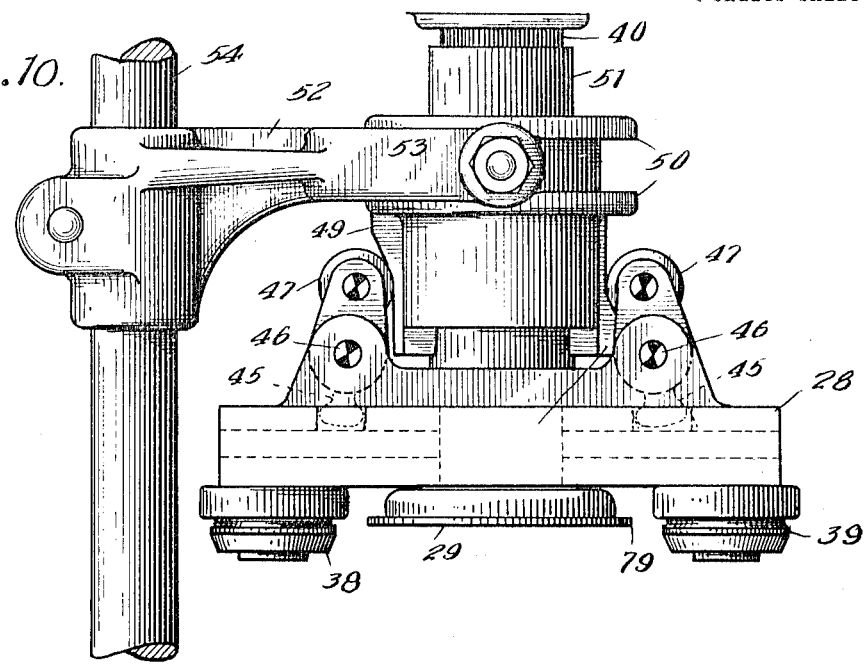
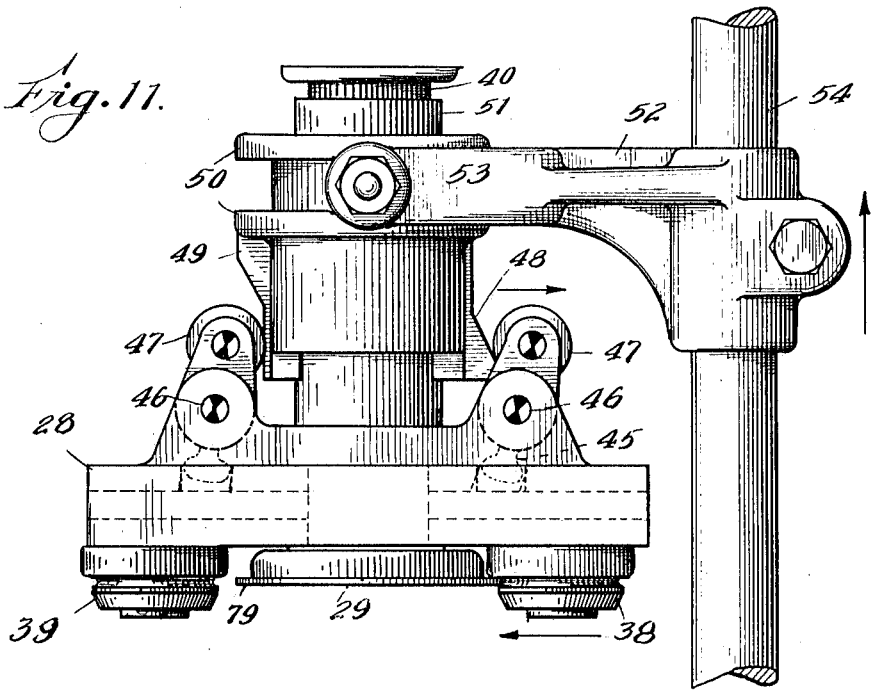

A. JOHNSON.
COMBINED CAN BODY FLANGING AND DOUBLE SEAMING MACHINE.
APPLICATION FILED DEC. 5, 1910.
1,040,951.
Patented Oct. 8, 1912.
9 SHEETS—SHEET 7.
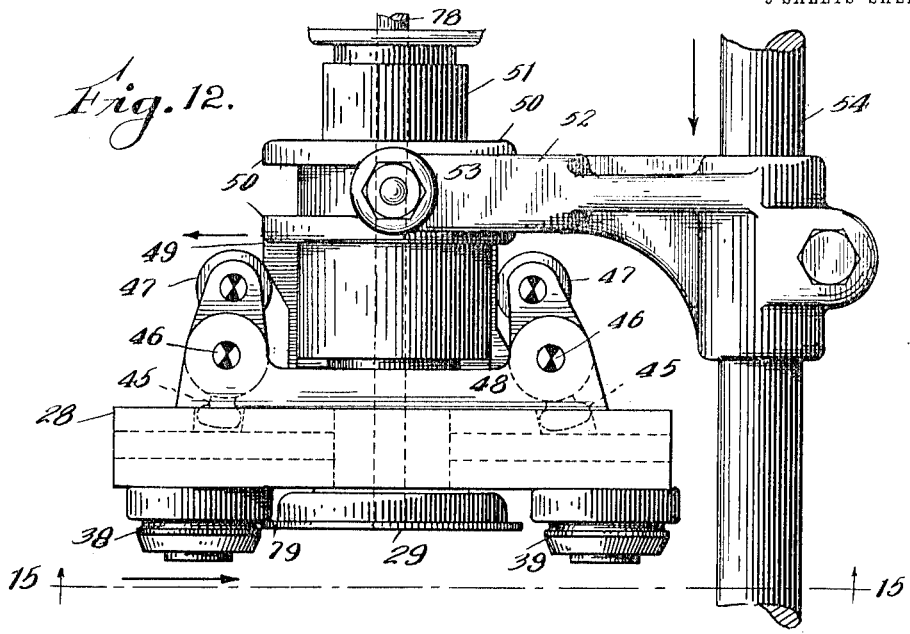
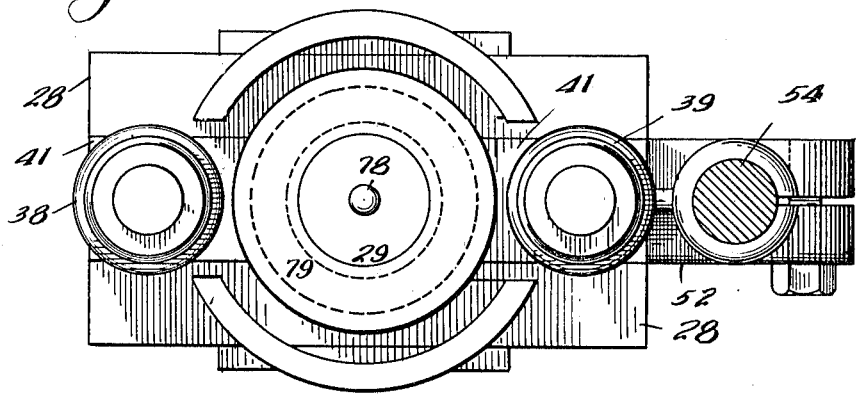
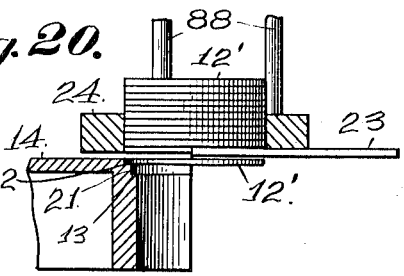

A. JOHNSON.
COMBINED CAN BODY FLANGING AND DOUBLE SEAMING MACHINE.
APPLICATION FILED DEC. 5, 1910.
1,040,951.
Patented Oct. 8, 1912.
9 SHEETS—SHEET 8.
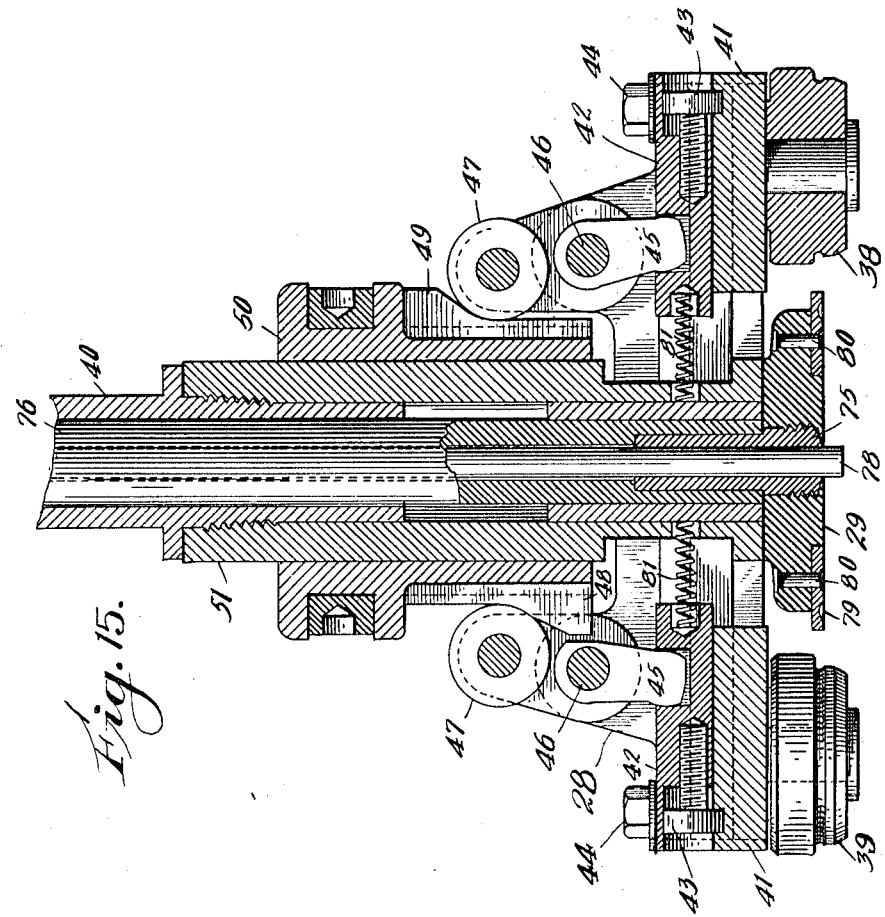

A. JOHNSON.
COMBINED CAN BODY FLANGING AND DOUBLE SEAMING MACHINE.
APPLICATION FILED DEC. 5, 1910.
1,040,951.
Patented Oct. 8, 1912.
9 SHEETS—SHEET 9.
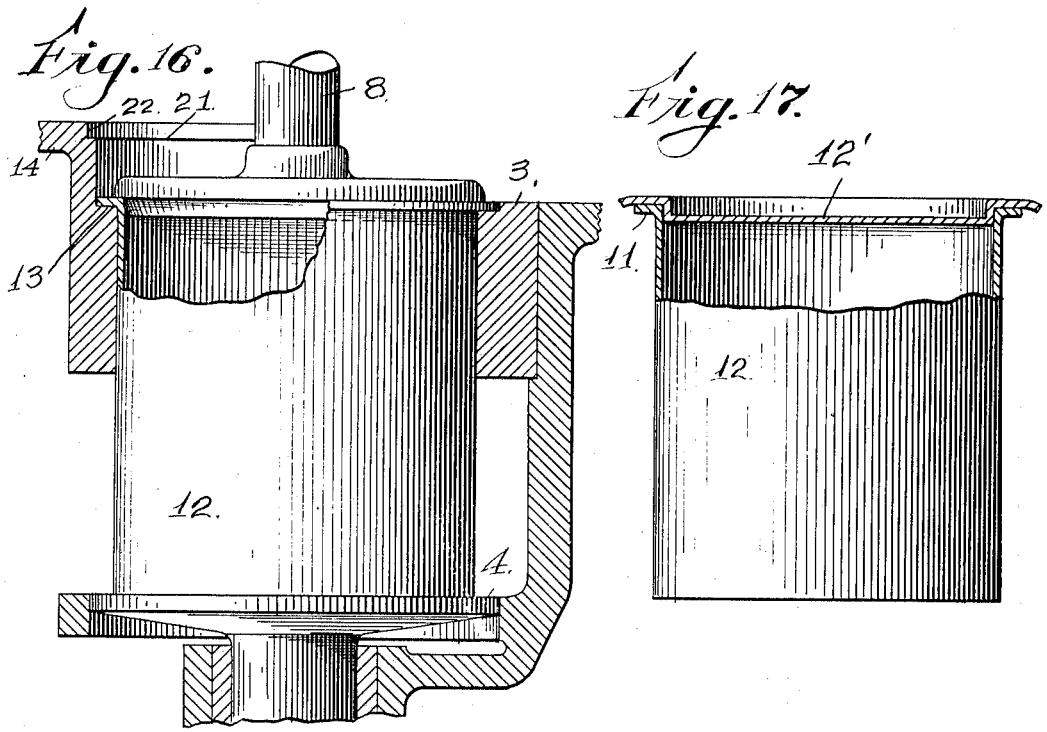
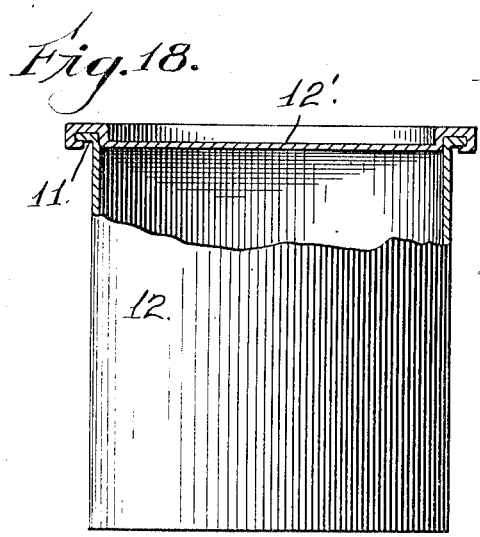
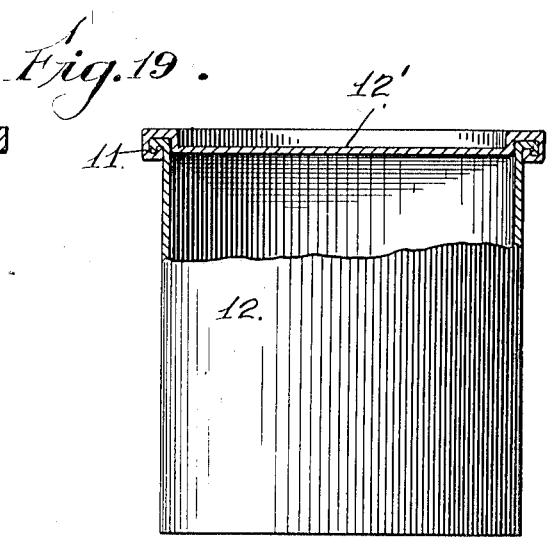

UNITED STATES PATENT OFFICE.

AXEL JOHNSON, OF SAN FRANCISCO, CALIFORNIA, ASSIGNOR TO AMERICAN CAN COMPANY, A CORPORATION OF NEW JERSEY.

COMBINED CAN-BODY FLANGING AND DOUBLE-SEAMING MACHINE.

1,040,951.  Specification of Letters Patent.  Patented Oct. 8, 1912.

Application filed December 5, 1910. Serial No. 595,608.

*To all whom it may concern:*

Be it known that I, AXEL JOHNSON, a citizen of the United States, residing in the city and county of San Francisco and State of California, have invented certain new and useful Improvements in Combined Can-Body Flanging and Double-Seaming Machines, of which the following is a specification.

My invention relates to improvements in can body flanging and double seaming machines.

The object of my invention is to provide an automatic machine of a simple, efficient and durable construction, by means of which the ends of can bodies may be flanged, the can heads automatically fed and assembled with the flanged can bodies and double seamed thereon, and hermetically tight seams formed with certainty and uniformity, and which will be adapted for use in canning factories for closing filled cans by double seaming the final heads or covers thereto.

The machine embodying my invention comprises in coöperative combination, a pair of rotary carriers, each furnished with a plurality of segmental flanging dies adapted to register together as the carriers rotate, a plurality of reciprocating flanging dies mounted on one of the carriers, a can head holder and can head feeder adapted to automatically feed or deliver the can heads or covers one by one to the flanged can bodies as they are moved toward the can head feed mechanism, the can head feeder being released by the action of the propelled can, and a further rotary carrier furnished with a plurality of pairs of can holder chucks and a plurality of double seaming heads, each furnished with a set of double seaming rollers or tools, and to which last mentioned carrier the flanged can bodies with the can heads thereon are delivered by the carrier to which the can heads are delivered, the same being the intermediate one of the three carriers.

My invention also consists in the novel construction of parts and devices and in the novel combinations of parts and devices herein shown and described and more particularly specified in the claims.

Figure 2:
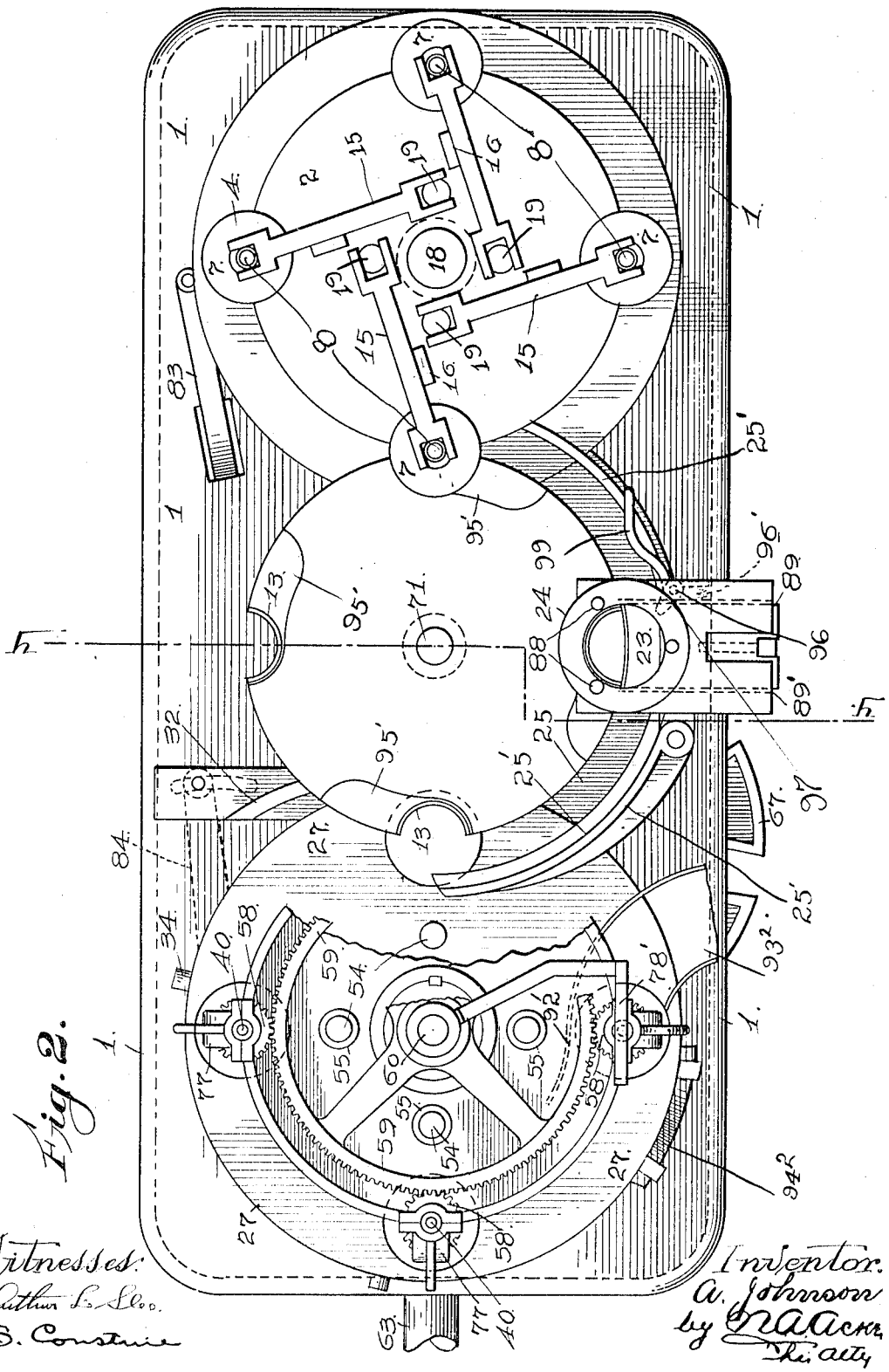
Figure 3:
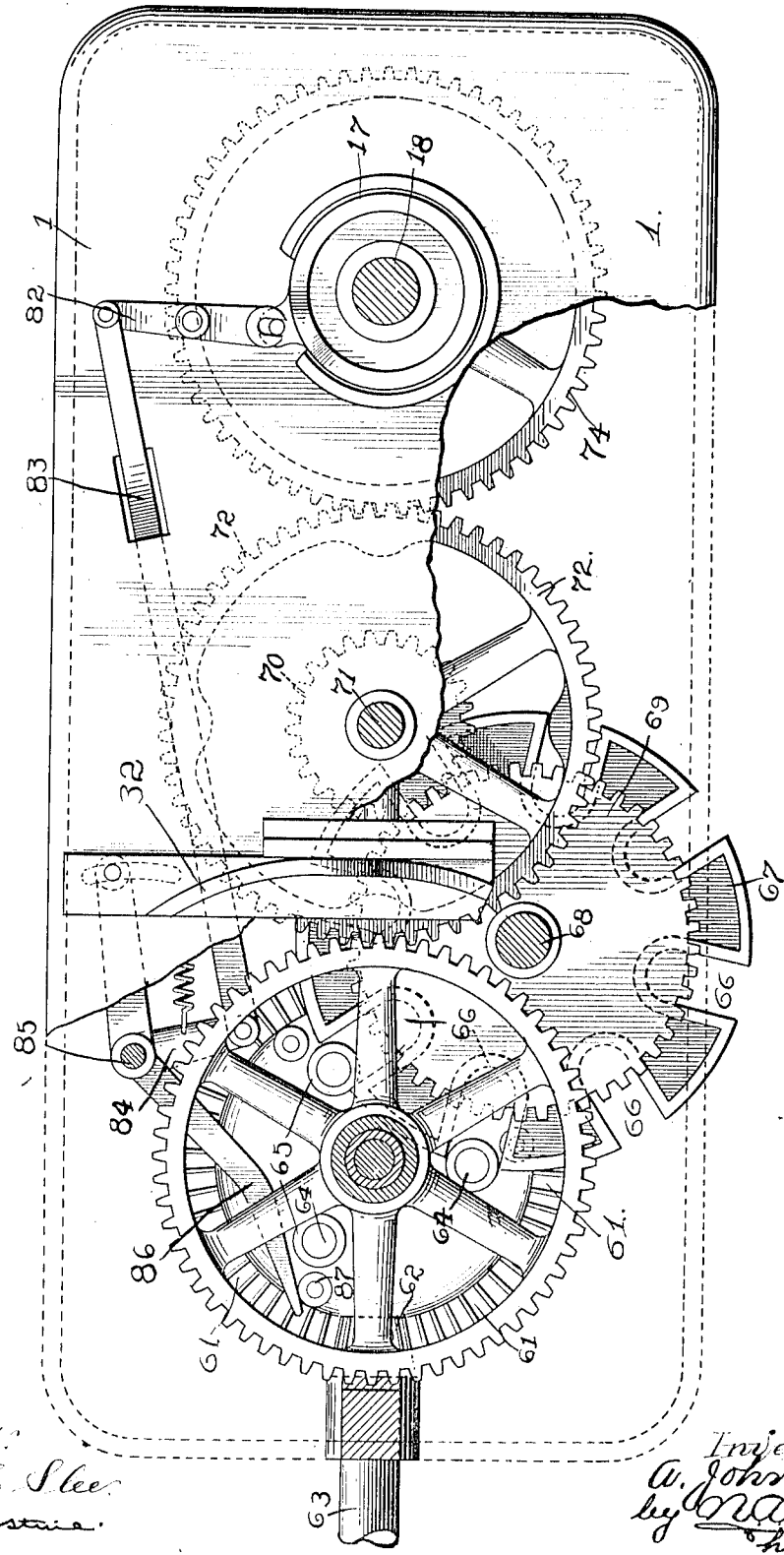
Figure 4:
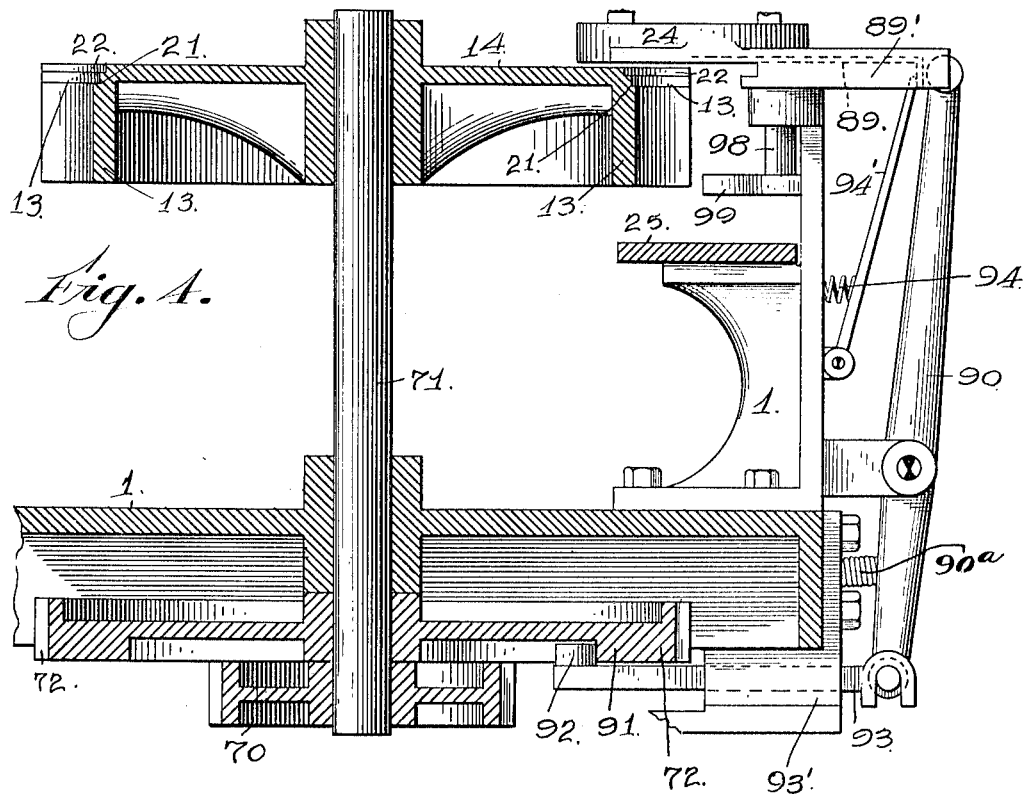
Figure 5:
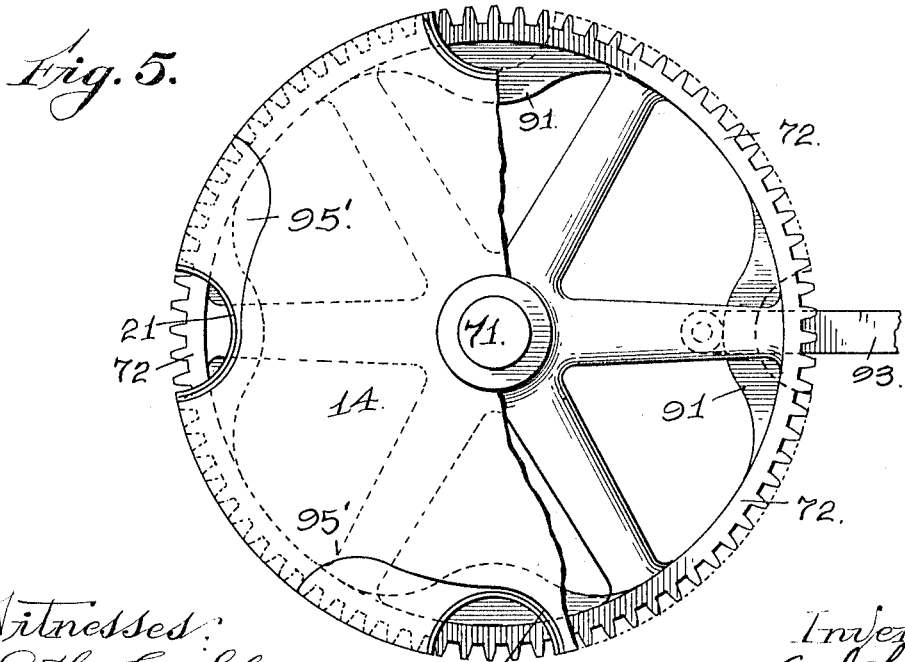

In the accompanying drawings forming a part of this specification, Figure 1 is a central, vertical, longitudinal section of a combined can body flanging and double seaming machine embodying my invention, partly in elevation. Fig. 2 is a plan view looking from the broken lines 2—2 of Fig. 1 of the drawings, illustrating the guide means for deflecting the flanged cans toward the feed mechanism for loosely applying the covers thereto and toward the carrier containing the seaming mechanism, also disclosing the discharge runway for the flanged and seamed cans. Fig. 3 is a detail plan view of the driving mechanism, partly in horizontal section. Fig. 4 is a cross sectional elevation taken on line $y$—$y$, Fig. 2 of the drawings, showing the can head holder and feeder. Fig. 5 is a detail broken plan view of the intermittently rotating carrier for conveying the flanged cans toward the carrier containing the seaming mechanism, the said view illustrating the drive gear for imparting motion to the carrier. Fig. 6 is a detail elevation, partly in section, of the cam and the connecting mechanism for raising or operating the lower can holding chuck of the double seaming head carrier. Fig. 7 is a detail elevation similar to Fig. 6, showing the parts in a different position. Fig. 8 is an enlarged detail elevation showing the cam for lowering the can holder chuck of the double seaming head carrier on the completion of the double seaming of the can cover to the flanged can. Fig. 9 is a detail elevation, part sectional, showing the means for removing the seamed can from the upper can holder chuck of the double seaming head carrier. Fig. 10 is a detail elevation of one of the rotary double seaming heads and its seaming rollers. Figs. 11 and 12 are detail elevations of the same, showing the parts in different positions. Fig. 13 is a bottom plan view of one of the double seaming heads, partly in section, on line 15—15 of Fig. 12. Fig. 14 is a front elevation of one of the double seaming heads. Fig. 15 is a central, vertical section of one of the double seaming heads. Fig. 16 is a detail sectional elevation of the flanging dies on a larger scale than that disclosed by Fig. 1 of the drawings. Figs. 17, 18 and 19 are detail part sectional views illustrating the steps carried out in the double seaming of the head or cover to the filled can. Fig. 20 is a broken detail elevation, partly in section, of the can head or cover holder and the feed slide working therein, illustrating the feed slide as cutting out one of the can covers from the stack of held covers.

Referring more particularly to Figs. 1 and 2 of the drawings, 1 represents the frame of the machine, the same being of any suitable form or construction adapted to give support to the other parts. 2 is an intermittently rotating carrier furnished with a plurality of segmental, external flanging dies 3, each adapted to partially embrace the end of the can body, and with a plurality of can holders 4, each preferably individually adjustable by means of a separate adjusting screw 5 mounted in a depending bracket or arm 6 of the carrier 2. The flanging die carrier 2 is also furnished with a plurality of reciprocating circular or internal flanging dies 7, each secured to a stem 8 extended through a suitable guide projecting from the bracket 10 secured to the carrier 2, and to coöperate with the segmental flanging die 3 on the carrier in forming the flange 11 on the can body 12, and also with the coöperating segmental external flanging die 13 on the intermediate rotary carrier 14, Figs. 1 and 16 of the drawings. Each of the flanging dies 7 is reciprocated as required, preferably by means of a lever 15, fulcrumed at 16 to the bracket 10, and operated by a movable cam 17 surrounding the upright shaft 18 of the carrier 2 through the connecting link 19, which is furnished with an anti-friction roller 20 for engagement with the cam 17, Figs. 1, 2 and 3 of the drawings. The intermediate flanging die carrier 14 rotates intermittently in unison with the flanging die carrier 2, and is furnished with a plurality of flanging dies 13, preferably four in number, so that a quarter turn of the carriers 2 and 14 brings a pair of the segmental flanging dies 3 and 13 into register with each other so that they completely surround and embrace the upper end of the can body and coact with the reciprocating flanging dies 7 to form a flange upon the upper end of the can body, Figs. 1 and 16 of the drawings. Each of the segmental flanging dies 13 on the rotary carrier 14 is furnished with an upward segmental extension 21 having a segmental groove or shoulder 22 to serve as a seat to receive and temporarily support the can head or cover when the same is fed to the carrier 14 by the can head feeder 23 from the can head holder 24, Figs. 2 and 4 of the drawings, which flanging die coöperates with the segmental guide wall 25' for holding the flanged can in proper position as propelled over the segmental can support 25 by the rotary carrier 14 beneath the can head feed mechanism and toward the seaming mechanism for securing the loosely applied head thereto, Figs. 2 and 4 of the drawings.

The intermittently rotating seaming head carrier upon which the rotary seaming heads and upper and lower can holder chucks are mounted, preferably consists for convenience of construction of two separate members, an upper one 26 upon which the rotary seaming heads 28 and upper can holder chucks 29 are mounted, and a lower one 27 upon which the lower can holder chucks 30 are mounted, both members 26 and 27 of the carrier being secured to the same upright hollow shaft or sleeve 31, Figs. 1, 6, 7, 8, 10, 11, 12 and 13 of the drawings. The carrier 26 is intermittently rotated in unison with the carriers 2 and 14 and is preferably furnished with four pairs of can holder chucks 29, 30, one chuck of each pair being mounted to reciprocate to and from the other to clamp and unclamp the can body and can head between them. The lower chuck 30 of each pair is preferably the reciprocating one and is preferably moved up and down as required to clamp and unclamp the can and to hold the same stationary during the double seaming operation by means of a stationary cam 32 on the frame of the machine through the bent lever 33, having roller 34 for engagement with the cam and toggle-acting connecting link 35 which is pivoted at its upper end to a block 36 carried by the lower chuck 30, a spring 37 being interposed to give the chuck a yielding clamping action against the can and to accommodate for slight variations in the length of the can bodies, Figs. 1, 6, 7 and 8 of the drawings.

The seaming head carrier 26 is furnished with four rotary seaming heads 28, one for each pair of can holder chucks 29, 30; Figs. 1 and 2 of the drawings, and each rotary seaming head is furnished with a set of double seaming rollers, Figs. 10, 12 and 15 of the drawings, each set of double seaming rollers preferably consisting of a seam forming roller 38 and a seam closing roller 39.

Each of the rotary seaming heads 28 is secured to and carried by a hollow shaft 40, and is provided with radial slides 41 upon which the seaming rollers 38 or 39 are directly journaled, each of the slides 41 having an adjusting member 42 secured thereto by an adjusting screw 43 and clamp screw 44.

Each of the seaming roller slides 41 is moved in and out to operate the seaming rollers by means of a seaming roller lever 45, fulcrumed by a pin 46 on the seaming roller head 28 and furnished with an anti-friction roller 47 for engagement with the cam 48 or 49 on the cam sleeve 50 which surrounds the hollow sleeve or hub 51 of the seaming head, Figs. 12 and 15 of the drawings. Each of the cam sleeves 50 is reciprocated as required to successively operate the seaming rollers 38, 39 by means of an arm 52, having a fork or yoke 53 engaging the cam sleeve 50, said arm 52 being secured to a vertically sliding rod 54 mounted in suitable guides 55 on the carrier 26, Figs. 1, 10, 11 and 12 of the drawings. The sliding rod 54 is reciprocated as required to accommodate the cam sleeve by means of a stationary cam 56 on the frame of the machine which engages an anti-friction roller 57 on the lower end of said rod 54, Fig. 1 of the drawings.

Each of the rotary seaming heads 28 is axially rotated as required for operating the seaming rollers carried thereby by means of a spur gear 58 on the seaming head shaft 40 which meshes with a spur gear 59 on the upright hollow shaft 31 of the rotary carrier 26, said shaft 60 having at its lower end a bevel gear 61 which meshes with a bevel gear 62 on the main driving shaft 63, Figs. 1, 2 and 3 of the drawings.

The required intermittently rotary movement is preferably imparted to the three rotary carriers, 26, 14 and 2 from the main driving shaft 63 by a Geneva stop movement, Figs. 1, 3 and 5 of the drawings, the pins 64 of which carrying the rollers 65 are on the upper face of the bevel gear 61, and the radial slots 66 of which are on wheel 67 on an upright countershaft 68 which carries a spur gear 69 which meshes with a spur gear 70 on the shaft 71 of the intermediate carrier 14. The shaft 71 has a spur gear 72 which meshes with a spur gear 73 on the hollow shaft 31 of the rotary carrier member 26, and also with a spur gear 74 on the shaft 18 of the rotary carrier 2, thus rotating the adjacent carriers in opposite directions as required.

Each of the upper non-rotary can holder chucks 29 is removably secured by screw threads to a two-part hollow stem or sleeve 75, 76 which is secured to a bracket or arm 77 on the rotary carrier 26, Figs. 1 and 15 of the drawings. Inside the hollow stem 75, 76 a movable knockout or ejector rod 78 is preferably provided, the upper end of which during the rotary travel of the carrier 26 moving beneath the downwardly incline cam plate 78′ is forced down to free or eject the can head after it is seamed to the can body from the upper can holder chuck 29, to prevent the headed can from sticking thereto. The upper can holder chuck 29 is preferably furnished with a removable chuck plate or ring 79 secured thereto by screws 80 so that it may be readily removed and replaced when desired, Fig. 15 of the drawings.

Each of the seaming roller slides 41, 42 is preferably furnished with a spring 81 for restoring the seaming rollers to their open or normal position after each seaming operation.

To properly throw the movable cam 17 which operates the reciprocating flanging dies 7 and thus cause each of the flanging dies to be properly reciprocated in unison with the segmental carrier 14 which carries the coöperating segmental flanging dies 13 at each stop or period of rest of the carriers 14 and 2, there is provided for said cam an operating lever 82, Fig. 3 of the drawings, which at one end engages the said cam and is connected at its opposite end by a link 83 with a bell crank lever 84 pivoted to the frame at 85, and having an arm 86 engaging successively the pins 87 carried and upwardly projecting from the bevel gear 61, one of said pins 87 being radially in line with each of the Geneva stop pins 64.

The can head holder 24 preferably consists of a base ring furnished with vertical guide pins 88, forming a holder in which the can heads may be placed in a pile or stack one flat on top of another, Fig. 20 of the drawings.

The flanged cans 12 are successively removed from the can holders 4 of the carrier 2 and guided toward the can cover feed mechanism as propelled by the intermittently rotating carrier 14 by means of the segmental deflecting guide wall 25′, which upwardly projects from a supporting shelf 25 onto which the flanged cans 12 are received as removed from the can holders 4 of the carrier 2, the forward end of the deflecting guide wall projecting within the path of the cans contained on the holders 4, while the supporting shelf 25 is in horizontal alinement with the intermittently rotating carriers 2 and member 27 of the seaming head carrier and forms the supporting connection between these said members, Fig. 2 of the drawings. The opposite end of the guide wall 25′ extends over the rotary carrier member 27 and guides the flanged cans 12 with the head loosely applied thereto as propelled over the supporting shelf 25 by the carrier 14 onto the said carrier member 27.

The can head feeder 23 preferably consists of a reciprocating blade mounted for movement in suitable guide-ways 89 in the supporting bracket 89′ attached to the frame of the machine, Fig. 4 of the drawings, and it is preferably thrown inwardly by a fulcrumed lever 90. The upper end of said lever 90 which bears against the slide or feeder blade 23 when thrown outwardly, is held inwardly by the pressure of a heavy compression spring 90ᵃ interposed between the frame 1 and the lower end portion of the lever 90 below its fulcrum point. The fulcrumed lever is actuated to throw outwardly its upper end by a series of inclined cams 91 secured to the under face of the gear 72 which cams are successively engaged by an anti-friction roller 92 on the connecting link 93 working through a guide 93′. The slide blade 23, when released, as hereinafter explained, is preferably thrown outwardly by a spring 94 acting against a pivoted lever arm 94', the upper end of which engages the outer end of the slide blade 23 and serves to return the same after being forced inwardly by the action of the lever 90, on the locking means for the slide blade being released and the upper end of the fulcrumed lever 90 being thrown outwardly by the action of the inclined cams 91 and roll 92. It will be understood that the spring 90ª is sufficiently heavier than spring 94 to overcome the opposition offered thereby, as the roll 92 rides off of the inclined cams 91 during the rotation of the gear 72. The said lever 90 at its upper end bears loosely against the outer end of the slide blade 23, when the same is at its outward position, as illustrated in Fig. 4 of the drawings. This feed slide 23 when moved inward by the throw of the lever 90, is held locked in said position by means of the locking catch 96, normally held inwardly pressed by the spring 96' and said catch engages with the notched section 97 of the feed slide 23, at one side thereof adjacent its inner end, Fig. 2 of the drawings. The locking catch 96 is carried at the upper end of a rotatable stud 98, to the lower end of which is attached a cam lever 99, which lever projects within the path of a can conveyed by the carrier 14 beneath the can head feed mechanism toward the carrier 26. As the cam lever 99 is engaged by the flanged can 12, the said lever is forced outwardly, turning the stud 98 to release the held feed slide 23, which is withdrawn from beneath the body of held can heads or covers 12' by the action of the spring 94, allowing the entire stack to lower the depth of one can head or cover, which loosely applies the lowermost one of the stack onto the flanged end of the can 12, a portion thereof resting within the segmental groove 22 of the flanging die 13 at a period or rest at such time beneath the can head or cover feed mechanism. However, prior to the removal of the flanged can with its loosely applied head or cover, the feed slide 23 will have been forced inward its full distance by the action of the lever 90, operated through the medium of the roll 92 working against the cam 91. As thus forced inwardly the feed slide 23 is moved between the lowermost two heads 12' of the stack, Fig. 20 of the drawings, cutting out, so to speak, the lowermost head or cover and sustaining or supporting the remainder of the stack, the said feed slide or blade as thus moved inwardly being held locked in such position by the spring held locking catch moving into engagement with the notched section 97 thereof, in which position it is held until the cam lever 99 is thrown by the next flanged can moved toward the can head feed mechanism. It will thus be noted that can heads are only released by the action of a flanged can, consequently the heads are only supplied on a flanged can being positioned to receive the same. The seamed cans are discharged from the carrier 26 by means of the deflecting wall extension 92' of the discharge runway 93', which wall extension lies within the path of the seamed can to remove the same from the chucks 30 and directs the said can into the discharge runway 93', Fig. 2 of the drawings. During the approach of the seamed can toward the discharge runway, the roll 34 of the can holding chuck 30 moves beneath the downwardly inclined cam plate 94², Fig. 8 of the drawings, and gradually draws downward the said holding chuck from its raised position, to place the seamed can supported thereon in line with the discharge runway 93²; the roll 34 entering beneath the cam plate 94² at approximately the same time as the upper projecting end of the ejector rod 78 moves beneath the inclined cam plate 78'.

Referring to Figs. 2 and 5 of the drawings, it will be noted that the surface of the intermediate carrier 14 is cut away at a downward incline adjacent each of the flanging dies 13, to form a supporting seat 95' onto which the can heads 12' are deposited from the can head feed mechanism, and which seats during the movement of the carrier gradually guide the same into the upper end of the flanging dies and onto the flanged end of the can as it is brought into vertical alinement with the can head holder 24. By this means the can heads are gradually lowered onto the flanged end of the can 12, and prevented from suddenly dropping thereon. In fact, the seats 95' may be said to constitute a curved outward inclined extension of the segmental groove 22 of the flanging dies 13.

The operation of the apparatus may be briefly described as follows, motion being imparted to the drive means for actuating the connected intermittently rotating carriers and their associated working parts. The cans to be flanged and have heads applied thereto are delivered, in any suitable manner onto the can holders 4 of the rotating carrier 2 and are conveyed thereby by an intermittent rotation toward the carrier 14 until the segmental flanging die 3 is in registry with the segmental flanging die 13 of the carrier 14, when the two carriers are brought to rest for a short period. During the interval of rest, the reciprocating flanging die 7 is lowered, to turn down the projecting end of the held can or can body 12 onto the segmental flanging dies 3 and 13 to form the circumferential flange 11. The flanging die 7 is then raised from within the segmental dies of the rotary carriers 2 and 14, and rotation imparted to said dies, the rotary travel of which carriers carry forwardly the flanged can body 12 until the same bears against the right hand projecting end of the curved deflecting wall 25', arranged above the holders 4 of the carrier 2 so as to engage with and cause the flanged can body to gradually move from within the sphere of the segmental die 3 and off of the holder 4 of the carrier 2 and be guided thereby onto the supporting shelf 25, during such movement the can body being held within the segmental die 13 of the carrier 14 by the deflecting wall 25', and being propelled by said carrier toward the can head feed mechanism. As thus moved, the retained can engages and throws the can lever 99, lying within the path of its movement, releasing the locking catch 96, when the feed blade 23 moves outwardly and permits the stack of retained can covers or heads to lower the depth of a single cover. The feed blade is then forced inwardly by the action of the lever 90 to cut out the lowermost can head of the stack of heads, leaving the same resting properly positioned on the flanged end of the can. The can with its loosely applied cover is then advanced toward the intermittently rotating carrier 26, until the said can is guided by the wall 25' onto one of the lower can holding chucks 30 of the said carrier 26, gradually moving from within the sphere of the segmental flanging die 13 of the rotary carrier 14. During the rotary travel of the carrier 26, the can holding chuck 30 is gradually raised to place the flanged can with its loosely applied head against the upper can holding chuck 29 and within the sphere of the seaming heads 28, when the double seaming rolls 38 and 39 successively act against the flange of the can head and of the held can to double seam the flange of one onto the other, after which the can holding chuck 30 is gradually lowered by the engagement of the roll 34 with the downwardly inclined cam plate 94' and the ejector rod 78 forced downward by its engagement with the cam plate 78' to force the double seamed can from within the seaming rolls. When thus lowered the double seamed can is gradually guided into the discharge runway 93'.

The working of the various parts of the apparatus is entirely automatic, and the working of the associated parts so timed as to come into action at the proper moment.

Having thus described the invention what is claimed as new and desired to protect by Letters Patent is—

1. In a can flanging and double seaming machine, the combination with an intermittently moving carrier having a plurality of pairs of upper and lower can holder chucks and a plurality of rotary seaming heads furnished with seaming rollers, of an intermittently rotating carrier having a plurality of segmental external flanging dies, an intermediate rotating carrier having a plurality of segmental external flanging dies, a reciprocating internal flanging die co-acting with segmental external flanging dies when in registry for flanging the end of a held can therein, and means for applying a can head to the flanged can prior to its delivery to the seaming rollers.

2. In a can flanging and double seaming machine, the combination with an intermittently moving carrier having a plurality of pairs of upper and lower can holder chucks and a plurality of rotary seaming heads furnished with seaming rollers, of an intermittently rotating carrier having a plurality of segmental external flanging dies and an intermediate rotating carrier having a plurality of segmental external flanging dies and a coöperating reciprocating flanging die.

3. In a can flanging and double seaming machine, the combination with an intermittently moving carrier having a plurality of pairs of upper and lower can holder chucks and a plurality of rotary seaming heads furnished with seaming rollers, of an intermittently rotating carrier having a plurality of segmental external flanging dies and a plurality of reciprocating internal flanging dies, and an intermediate rotating carrier having a plurality of segmental external flanging dies.

4. In a can flanging and double seaming machine, the combination with an intermittently moving carrier having a plurality of pairs of upper and lower can holder chucks and a plurality of rotary seaming heads furnished with seaming rollers, of an intermittently rotating carrier having a plurality of segmental external flanging dies and an intermediate rotating carrier having a plurality of segmental external flanging dies, a coöperating reciprocating flanging die, a can head holder and a can head feeder.

5. In a can flanging and double seaming machine, the combination with an intermittently moving carrier having a plurality of pairs of upper and lower can holder chucks and a plurality of rotary seaming heads furnished with seaming rollers, of an intermittently rotating carrier having a plurality of segmental external flanging dies and a plurality of reciprocating internal flanging dies and an intermediate rotating carrier having a plurality of segmental external flanging dies, a can head holder and a can head feeder for delivering the can heads to said intermediate carrier.

6. In a can flanging and double seaming machine, the combination with an intermittently moving carrier having a plurality of pairs of upper and lower can holder chucks and a plurality of rotary seaming heads furnished with seaming rollers, of an intermittently rotating carrier having a plurality of segmental external flanging dies and an intermediate rotating carrier having a plurality of segmental external flanging dies, a coöperating reciprocating flanging die, a segmental can support interposed between the outer carriers, a wall carried thereby co-acting with the intermediate carrier for holding the flanged can in position, and guiding the same from one outer carrier onto the other, a can head holder and a can head feeder.

7. In a can flanging and double seaming machine, the combination with an intermittently moving carrier having a plurality of pairs of upper and lower can holder chucks and a plurality of rotary seaming heads furnished with seaming rollers, of an intermittently rotating carrier having a plurality of segmental external flanging dies and a plurality of reciprocating internal flanging dies, and an intermediate rotating carrier having a plurality of segmental external flanging dies, and means co-acting with the intermediate carrier for loosely applying can heads to the flanged end of the cans as conveyed toward the seaming mechanism.

8. In a can closing machine, the combination with a carrier having a plurality of lower reciprocating can holder chucks, a plurality of upper can holder chucks, a plurality of rotary seaming heads furnished with seaming rollers, a second carrier having a plurality of segmental external flanging dies, an intermediate carrier having a plurality of external segmental flanging dies, and a reciprocating internal flanging die for upsetting the end of the can.

9. In a can closing machine, the combination with a carrier having a plurality of lower reciprocating can holder chucks, a plurality of upper can holder chucks, a plurality of rotary seaming heads furnished with seaming rollers, a second carrier having a plurality of segmental external flanging dies, an intermediate carrier having a plurality of external segmental flanging dies, a reciprocating internal flanging die, a can head holder, and means for delivering can heads therefrom and loosely applying the same to the flanged end of the can.

10. The combination with an intermittently moving carrier having a plurality of segmental external flanging dies, of a coöperating intermittently moving carrier having a plurality of segmental external flanging dies, a reciprocating internal flanging die for upsetting the end of a held can, devices for actuating said die, and mechanism for receiving the flanged can from the second mentioned carrier and seaming thereto a loosely applied head.

11. The combination with an intermittently moving carrier having a plurality of segmental external flanging dies, of a coöperating intermittently moving carrier having a plurality of segmental external flanging dies, a reciprocating internal flanging die for upsetting the end of a can held between the flanging dies, one of said carriers having a plurality of can supports, a third carrier provided with a plurality of seaming rollers, and means for positioning can heads relative to the flanged cans as conveyed toward the carrier containing the seaming rollers.

12. The combination with an intermittently moving carrier having a plurality of segmental external flanging dies, of a coöperating intermittently moving carrier having a plurality of segmental external flanging dies and a reciprocating flanging die, one of said carriers having a plurality of can supports, and a further intermittently moving carrier having a plurality of upper and lower can holder chucks and a plurality of rotary seaming heads furnished with seaming rollers.

13. The combination with an intermittently rotating carrier having a plurality of pairs of upper and lower can holder chucks, and provided with a plurality of rotary seaming heads furnished with seaming rollers and each provided with a sliding cam sleeve and connections for operating the seaming rollers, means for reciprocating the lower can holder chucks of each pair as the carrier rotates, an intermittently rotating carrier furnished with a plurality of segmental external flanging dies, a reciprocating internal flanging die, an intermediate carrier having a plurality of can head supporting seats, a stationary segmental can support intermediate the outer carriers and concentric with said intermediate carrier, and means for loosely applying can heads to the flanged cans as propelled over the said can support.

14. The combination with an intermittently rotating carrier having a plurality of pairs of upper and lower can holder chucks, and provided with a plurality of rotary seaming heads furnished with seaming rollers and each provided with a sliding cam sleeve and connections for operating the seaming rollers, means for reciprocating the lower can holder chucks of each pair as the carrier rotates, an intermittently rotating carrier furnished with a plurality of segmental external flanging dies, a reciprocating internal flanging die, means for actuating the reciprocating internal flanging die, an intermediate carrier having a plurality of can head supporting seats, a stationary segmental can support seat concentric with said intermediate carrier, a can head holder and a can head feeder.

15. The combination with a rotary carrier having a plurality of pairs of can holder chucks and a plurality of rotary seaming heads furnished with seaming rollers, of a rotary carrier having a plurality of segmental external flanging dies and a plurality of reciprocating internal flanging dies, a movable cam and connections for operating said reciprocating flanging dies and an intermediate rotary carrier having a plurality of segmental external flanging dies.

16. The combination with a rotary carrier having a plurality of pairs of can holder chucks and a plurality of rotary seaming heads furnished with seaming rollers, of a rotary carrier having a plurality of segmental external flanging dies and a plurality of reciprocating internal flanging dies, a movable cam and connections for operating said reciprocating flanging dies and an intermediate rotary carrier having a plurality of segmental external flanging dies, a can head holder and a can head feeder.

17. The combination with a rotary carrier having a plurality of pairs of can holder chucks and a plurality of rotary seaming heads furnished with seaming rollers, of a rotary carrier having a plurality of segmental external flanging dies and a plurality of reciprocating internal flanging dies, a movable cam and connections for operating said reciprocating flanging dies and an intermediate rotary carrier having a plurality of segmental external flanging dies, said intermediate carrier having a plurality of can head supporting seats, and a coöperating stationary segmental can support.

18. The combination with a rotary carrier having a plurality of pairs of can holder chucks and a plurality of rotary seaming heads furnished with seaming rollers, of a rotary carrier having a plurality of segmental external flanging dies and a plurality of reciprocating internal flanging dies, a movable cam and connections for operating said reciprocating flanging dies and an intermediate rotary carrier having a plurality of segmental external flanging dies, said intermediate carrier having a plurality of can head supporting seats, and a coöperating stationary segmental can support, a can head holder and a can head feeder.

19. The combination with a rotary carrier having a plurality of pairs of can holder chucks and a plurality of rotary seaming heads furnished with seaming rollers, of a rotary carrier having a plurality of segmental external flanging dies and a plurality of reciprocating internal flanging dies, a movable cam and connections for operating said reciprocating flanging dies and an intermediate rotary carrier having a plurality of segmental external flanging dies, a coöperating stationary segmental can support, devices for releasing can heads and loosely positioning the same above the flanged cans, and means for reciprocating the lower can holder chucks of said first mentioned carrier to lift the cans and clamp the cans and can heads together and hold the same stationary during the seaming operation, substantially as specified.

20. The combination with a rotary carrier having a plurality of pairs of can holder chucks and a plurality of rotary seaming heads furnished with seaming rollers, of a rotary carrier having a plurality of segmental external flanging dies and a plurality of reciprocating internal flanging dies, a movable cam and connections for operating said reciprocating flanging dies and an intermediate rotary carrier having a plurality of segmental external flanging dies, said intermediate carrier having a plurality of can head supporting seats, a coöperating stationary segmental can head supporting seat, a can head holder, and a can head feeder, and means for reciprocating the lower can holder chucks of said first mentioned carrier to lift the cans and clamp the cans and can heads together and hold the same stationary during the seaming operation, substantially as specified.

21. The combination with an intermittently rotating carrier having a plurality of upper and lower can holder chucks and a plurality of rotary seaming heads furnished with seaming rollers, of an intermittently rotating carrier having a plurality of can supports, a plurality of segmental external flanging dies and an intermediate rotary carrier having a plurality of segmental external flanging dies, a reciprocating internal flanging die, and means for actuating the same.

22. The combination with an intermittently rotating carrier having a plurality of upper and lower can holder chucks and a plurality of rotary seaming heads furnished with seaming rollers, of an intermittently rotating carrier having a plurality of can supports and a plurality of segmental external flanging dies, an intermediate rotary carrier having a plurality of segmental external flanging dies and a plurality of can head supporting seats, a reciprocating internal flanging die, means for actuating the same, and an automatic can head feeder actuated by the movement of the can propelled by the intermediate carrier.

23. The combination with an intermittently rotating carrier having a plurality of upper and lower can holder chucks and a plurality of rotary seaming heads furnished with seaming rollers, of means for raising and lowering the lower can holder chucks, an intermittently rotating carrier having a plurality of can supports and a plurality of segmental external flanging dies, and an intermediate rotary carrier having a plurality of segmental external flanging dies and a plurality of can head supporting seats, a reciprocating internal flanging die, means for actuating the same, a can head holder, a can head feeder, a segmental stationary can support intermediate the outer carriers, and a guide wall co-acting therewith for holding the flanged can in the flanging dies of the intermediate carrier.

24. The combination with an intermittently rotating carrier having a plurality of upper and lower can holder chucks and a plurality of rotary seaming heads furnished with seaming rollers, of an intermittently rotating carrier having a plurality of can supports and a plurality of segmental external flanging dies and an intermediate rotary carrier having a plurality of segmental external flanging dies, and a reciprocating internal flanging die.

25. The combination with an intermittently rotating carrier having a plurality of upper and lower can holder chucks and a plurality of rotary seaming heads furnished with seaming rollers, of means for raising and lowering the lower can holder chucks, an intermittently rotating carrier having a plurality of can supports and a plurality of segmental external flanging dies and an intermediate rotary carrier having a plurality of segmental external flanging dies and a plurality of can head supporting seats, and a reciprocating internal flanging die.

26. The combination with an intermittently rotating carrier having a plurality of upper and lower can holder chucks and a plurality of rotary seaming heads furnished with seaming rollers, of means for raising and lowering the lower can holder chucks, an intermittently rotating carrier having a plurality of can supports and a plurality of segmental external flanging dies and an intermediate rotary carrier having a plurality of segmental external flanging dies and a plurality of can head supporting seats, a can head holder, a can head feeder and a segmental stationary can head supporting seat or guide, and a reciprocating internal flanging die.

27. The combination with a rotary carrier having a plurality of axially rotatable seaming heads furnished with seaming rollers, and a plurality of upper and lower can holder chucks, of a stationary cam for reciprocating the lower can holder chucks as the carrier rotates, each of said lower chucks having a bent lever carrying a roller for engagement with said cam and a toggle link, a second carrier provided with a plurality of segmental external flanging dies and a plurality of can supports, a coöperating rotary carrier interposed between the mentioned carriers and provided with a plurality of segmental external flanging dies for registry with those of the second mentioned carrier, a reciprocating internal flanging die, means for actuating the same, and mechanism for positioning can heads above the flanged cans as conveyed by the intermediate carrier to the carrier containing the seaming rollers.

28. The combination with a rotary carrier having a plurality of axially rotatable seaming heads furnished with seaming rollers, and a plurality of upper and lower can holder chucks, of a stationary cam for reciprocating the lower can holder chucks as the carrier rotates, each of said lower chucks having a bent lever carrying a roller for engagement with said cam and a toggle link, a movable block and a spring interposed between said block and said lower chuck, a second carrier provided with a plurality of segmental external flanging dies and a plurality of can supports, a coöperating rotary carrier interposed between the mentioned carriers and provided with a plurality of segmental external flanging dies for registry with those of the second mentioned carrier, a reciprocating internal flanging die, means for actuating the same, and mechanism for positioning can heads above the flanged cans as conveyed by the intermediate carrier to the carrier containing the seaming rollers.

29. The combination with an intermittently rotating carrier having a plurality of segmental external flanging dies and a plurality of can supports, of a coöperating intermittently rotating carrier having a plurality of segmental external flanging dies, a reciprocating internal flanging die, means for actuating said reciprocating die on the flanging dies when the latter are brought into registry, and mechanism for receiving the flanged can from the second mentioned carrier and seaming thereto a loosely applied head.

30. The combination with an intermittently rotating carrier having a plurality of segmental external flanging dies and a plurality of can supports, of a coöperating intermittently rotating carrier having a plurality of segmental external flanging dies and a plurality of reciprocating flanging dies mounted on said first mentioned carrier, means for actuating said reciprocating dies as the flanging dies of the carriers are brought into registry, and mechanism for receiving the flanged can from the second mentioned carrier and seaming thereto a loosely applied head.

31. The combination with an intermittently rotating carrier having a plurality of segmental external flanging dies and a plurality of can supports, of a coöperating intermittently rotating carrier having a plurality of segmental external flanging dies and a reciprocating internal flanging die, a can head holder, a can head feeder, means actuated by the movement of a propelled flanged can for releasing the said feeder, and mechanism for receiving the flanged can from the second mentioned carrier and seaming thereto a loosely applied head.

32. The combination with an intermittently rotating carrier having a plurality of segmental external flanging dies and a plurality of can supports, of a coöperating intermittently rotating carrier having a plurality of segmental external flanging dies, a plurality of reciprocating flanging dies mounted on said first mentioned carrier, means for actuating the reciprocating dies on the flanging dies of the carriers being brought into registry, a can head holder and a can head feeder, and mechanism for receiving the flanged can from the second mentioned carrier and seaming thereto a loosely applied head, substantially as specified.

33. The combination with an intermittently rotating carrier provided with a plurality of can supports and a plurality of semicircular walls to receive the cans to be flanged, of a plurality of reciprocating internal flanging dies mounted on said carrier, means for imparting reciprocating movement to said dies, a second carrier provided with a plurality of semi-circular walls which register with those of the first mentioned carrier for the holding of a can during the operation of flanging the end thereof, of mechanism for receiving the flanged can from the second carrier and seaming a head thereto, and means for delivering and positioning can heads above the flanged end of the cans as conveyed toward the seaming mechanism by the second mentioned carrier.

34. The combination with an intermittently rotating carrier having a plurality of can supports and a plurality of semi-circular walls to receive the cans, of a plurality of reciprocating internal flanging dies mounted on said carrier, and a second carrier having a plurality of segmental can head seats and a plurality of semi-circular walls which register with those of the first mentioned carrier to receive the cans and to remove the flanged cans from the said first carrier, means for actuating the said flanging dies when the semi-circular walls of the carriers are in registry, means for delivering and positioning heads above the flanged cans, and mechanism for receiving the flanged cans from the second mentioned carrier and seaming thereto a loosely applied head.

35. The combination with an intermittently rotating carrier having a plurality of can supports and a plurality of semi-circular walls to receive the cans, of a plurality of reciprocating internal flanging dies mounted on said carrier, devices for actuating said reciprocating dies, a second carrier furnished with a plurality of pairs of upper and lower can holder chucks and a plurality of rotary seaming heads furnished with seaming rollers, a supporting carrier provided with semi-circular walls situated intermediate the mentioned carriers for removing the flanged can from one carrier and delivering the same to the other carrier, the walls of the intermediate carrier registering with those of the first mentioned carrier to form flanging dies with which the reciprocating dies co-act and the said intermediate carrier serving to deliver the flanged cans to the second mentioned carrier, and means for automatically delivering can heads to the intermediate carrier and positioning the said can heads relative to the flanged can as moved toward the carrier containing the seaming mechanism.

36. The combination with an intermittently rotating carrier having a can support and a curved recess to receive a can, a reciprocating internal flanging die, devices for actuating said die, a second carrier having a pair of upper and lower can holder chucks and a rotary seaming head furnished with seaming rollers, means for raising and lowering the lower can holder chucks, an intermediate carrier having a can head seat and a recess which registers with the recess of the first mentioned carrier to form a flanging die with which the reciprocating die co-acts for flanging the end of a held can and for removing the flanged can from said first mentioned carrier and delivering the same to second mentioned carrier, and means for loosely applying heads to the flanged end of the can as moved by the intermediate carrier toward the carrier containing the seaming mechanism.

37. The combination with an intermittently rotating carrier having a can support and a curved recess to receive a can, a reciprocating internal flanging die, a second carrier having a pair of upper and lower can holder chucks and a rotary seaming head furnished with seaming rollers, means for raising and lowering the lower can holder chucks, an intermediate carrier having a can head seat and a recess which registers with the recess of the first mentioned carrier to clamp therein a can to be flanged and remove the flanged can therefrom, and a stationary segmental can support over which the flanged can is propelled from the first mentioned carrier and guided onto the second named carrier, and an intermittent can head feeder for supplying can heads to the flanged can, the same being thrown into action by the movement of the cans as propelled over the can support.

38. The combination with an intermittently rotating carrier, having a plurality of segmental flanging dies and a plurality of can supports, of a coöperating intermittently rotating carrier, having a plurality of segmental flanging dies, a reciprocating die for flanging the end of a held can, means for actuating said die when the segmental dies of the carriers are brought into registry, a third intermittently rotating carrier furnished with a plurality of pairs of upper and lower can holder chucks and a plurality of rotary seaming heads for the upper chucks furnished with seaming rolls, a device for guiding flanged cans from the first mentioned carrier onto the last mentioned carrier, an intermittently can controlled feeder for supplying can heads to the cans as conveyed toward the carrier containing the seaming means, and devices for raising and lowering the lower can holder chucks to place the cans into and out of the sphere of the seaming rolls of the upper chuck.

39. The combination with a rotary carrier having a plurality of can holders, a vertically reciprocating die for flanging the end of a held can, means for raising and lowering the same, a further rotary carrier provided with a plurality of means for receiving, clamping and seaming a head loosely applied to the flanged end of a can, instrumentalities intermediate the said carriers and co-acting with the first-mentioned carrier for holding the cans positioned for flanging and for guiding and conveying a flanged can from one carrier onto the other, and intermittently can actuated mechanism for delivering can heads onto the flanged cans as conveyed from the flanging carrier toward the seaming carrier.

In testimony whereof I have signed my name to this specification in the presence of two subscribing witnesses.

AXEL JOHNSON.

Witnesses:
N. A. ACKER,
D. B. RICHARDS.